United States Patent Office 3,230,229
Patented Jan. 18, 1966

3,230,229
SELECTED ISOTHIAZOLES AND THEIR PREPARATION
William R. Hatchard, Wilmington, Del., assignor to E. I. du Pont de Nemours and Company, Wilmington, Del., a corporation of Delaware
No Drawing. Filed Oct. 19, 1961, Ser. No. 146,370
31 Claims. (Cl. 260—299)

This invention relates to new heterocyclic compounds having sulfur and nitrogen as members of the heterocyclic ring. More particularly, it relates to, and has as its principal objects provision of, novel isothiazoles and a method of preparing the same.

The products of this invention includes isothiazoles represented by Formula I,

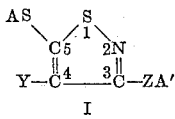

where Y is carboxyl or a group convertible to carboxyl by hydrolysis, especially cyano, halocarbonyl, carbamoyl, substituted carbamoyl, or hydrocarbyloxycarbonyl; Z is oxygen or sulfur; A is a metal (particularly an alkali metal), an ammonium or substituted ammonium group, or an organic group devoid of peroxide (—O—O—) groups and of aliphatic iodine and sulfate and bonded to the sulfur through a carbon free of carbon-carbon unsaturation; and A′ is the same A or different and is hydrogen or any of the groups listed for A, with the proviso that Y can be other than cyano only when A and A′ are organic groups devoid of periodic groups an dof aliphatic iodine or sulfate and bonded to S and Z through saturated carbon. Among the metal salts (A and/or A′ being a metal), the alkali-metal salts are preferred because they are more easily available than are the starting materials for the other metal salts. Alkali-metal salts are also preferred over ammonium and substituted ammonium salts because they have better long-term stability and are usually more easily isolated as solids. Alkali metals are preferred over organic groups as values of A and A′ because they are more easily made and are the starting materials for the organic derivatives. More detailed definitions of Y, A and A′ appear below.

This invention also includes sulfoxides and sulfones obtained by oxidation of the thio function or functions in the isothiazoles of Formula I. These oxidized products are represented by Formula II:

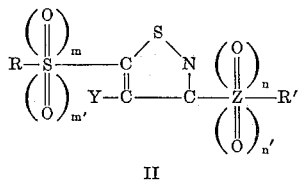

where $m$, $m'$, $n$, and $n'$ are 0 (zero) or 1, their sum being at least 1; where $n$ and $n'$ are always 0 when Z is oxygen; where, when Z is sulfur, the sum of $m$ and $m'$ cannot differ from the sum of $n$ and $n'$ by more than one; and where R and R′ are the same or different and are organic groups devoid of peroxidic groups and of aliphatic iodine and sulfate and bonded to S and Z through saturated carbon.

When A or A′ or both are metal atoms, it will be understood by one skilled in the art that the number of metal atoms per isothiazole unit will depend in part on the valence of the metal. The composition of such metal derivatives can be more exactly expressed by Formulas III and IV:

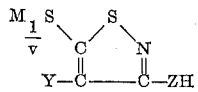 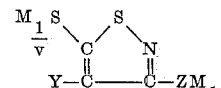

III IV where M is a metal of valence $v$ and Y and Z are as above, it being understood that the term "$M_1/v$" is used for convenience of expansion only, that there are actually no fractional numbers of metal atoms present in the molecule, and that therefore any amount of the compounds depicted by Formulas III and IV contains a whole number of metal atoms. One skilled in the art will also know that the compounds defined by Formulas III and IV can also be expressed in other ways, for example, by Formulas V and VI:

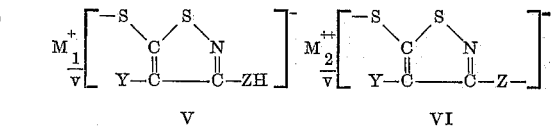

V VI

The products of Formula I in which A and A′ represent an alkali metal or an ammonium or substituted ammonium group and Y is CN are made by reacting an oxidizing agent or a sulfurizing agent with an alkali-metal, ammonium, or substituted ammonium salt of dicyano-1,1-ethylenedithiol:

(1)

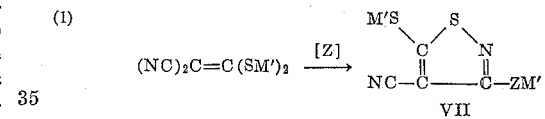

where M′ is an alkali metal or an ammonium or substituted ammonium group, Z is oxygen or sulfur, and the term "[Z]" is a well-known way of representing the net addition of one atom of the element Z, by reaction, in this case, with an oxidizing agent or a sulfurizing agent.

Products of Formula I in which A and A′ are non-alkali metals and Y is CN are made by reacting an alkali-metal, ammonium, or substituted ammonium salt of a 3,5-di-substituted-4-isothiazolecarbonitrile, made by the process of Equation 1, with a salt of a nonalkali metal. The essential reaction can be represented by the following equation:

(2)

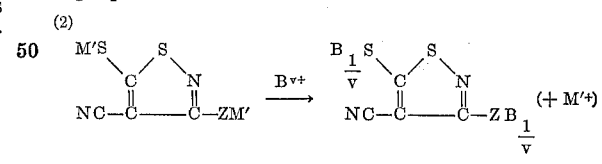

where M′ is an alkali metal or an ammonium or substituted ammonium group and B is a nonalkali metal of valvence $v$, the term "$B^{v+}$" representing an ion of the metal B. For some metals, product VIII can also be made by the method of Equation 1, the salt of the metal B with dicyano-1,1-ethylenedithiol being substituted for the alkali-metal, ammonium, or substituted ammonium salt.

The products of Formula I in which A′ is hydrogen and A is a metal or an ammonium or substituted ammonium group can be made by treating the products of Equation 1 or 2 with one equivalent of a mineral acid.

Products of Formula I in which Y is CN, Z is oxygen or sulfur, A is an organic radical devoid of peroxidic groups and of aliphatic iodine and sulfate and bonded to sulfur through a carbon free of carbon-carbon unsaturation, and A′ is hydrogen, a metal, or an ammonium or substituted ammonium group are prepared by reacting a product of Equation 1 with one equivalent of an organic ester or organic mixed anhydride of an inorganic acid. The reaction can be represented by the following equation:

(3)

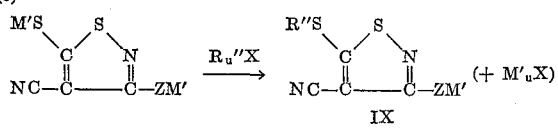

in which Z is oxygen or sulfur; M' is an alkali metal or an ammonium or substituted ammonium group; R″ is an organic radical devoid of peroxidic groups and of aliphatic iodine and sulfate and bonded to S through a carbon free of carbon-carbon unsaturation; and X is an anion, of valence $u$, of an inorganic acid. Product IX can be converted to the product of Formula I where A′ is hydrogen by acidification with a mineral acid; it can be converted to a nonalkali-metal derivative by reaction with one equivalent of a nonalkali-metal salt as described above (cf. Equation 2).

Products of Formula I in which both A and A′ are organic groups are prepared by reacting product IX with a second equivalent of an organic ester or organic mixed anhydride of an inorganic acid. The reaction can be represented by the following equation:

(4)

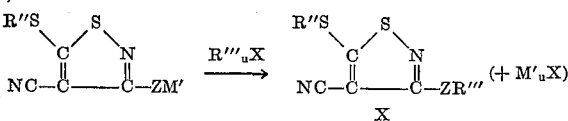

where R‴ is an organic radical devoid of peroxidic groups and of aliphatic iodine and sulfate and bonded to Z through a carbon free of carbon-carbon unsaturation and can be the same as R″ or different, and R″, M′, Z, X and $u$ are as above. When R″ and R‴ are the same, the preparation of X can also be carried out by reacting the isothiazole reactant of Equation 3 with two equivalents of the compound R″$_u$X:

(5)

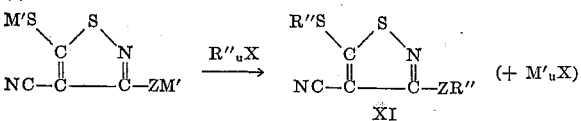

The products of this invention where Y is carboxyl or a group (other than cyano) hydrolyzable to carboxyl are prepared by treatment of the cyano compounds (Y=CN) in accordance with suitable methods of hydrolysis, esterification, and amidation well known to those skilled in the art. In addition to carboxyl and cyano, Y may be other groups hydrolyzable to carboxyl including halocarbonyl,

where X is halogen, especially fluorine, chlorine, or bromine; hydrocarbyloxycarbonyl (e.g., alkoxycarbonyl),

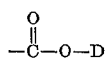

carbamoyl; and substituted carbamoyl,

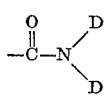

where D is lower alkyl and D′ is hydrogen or lower alkyl. Cyano is preferred over the other groups above because of the relative ease of preparation of the products. Examples of Y are carboxyl, cyano, bromocarbonyl, and carbamoyl.

The sulfoxides and sulfones of this invention defined by Formula II are prepared by treatment of the corresponding organic-mercapto compounds,

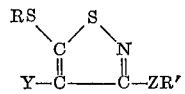

where R, R′, Z, and Y are as defined previously, in accordance with suitable methods of oxidation well known to those skilled in the art, e.g., Wagner and Zook, "Synthetic Organic Chemistry," page 801 (Wiley 1953), with references to the original literature. Wagner and Zook give 30% hydrogen peroxide as the best general oxidizing agent, with acetone or acetic acid as solvent. Other usable oxidizing agents include chromic anhydride, perbenzoic acid, and potassium permanganate.

As can be seen from the foregoing statement of the process of this invention, the starting materials for the preparation of all the products of the invention are alkali-metal, ammonium, and substituted ammonium salts of dicyano-1,1-ethylenedithiol. The preparation as intermediates, but not the isolation, of such alkali-metal salts is described in U.S. 2,533,233. The sodium salt is more conveniently prepared and isolated by the following modification of the described procedure:

Malononitrile (66 g.) was added slowly to a suspension of 80 g. of sodium hydroxide in 900 ml. of 95% alcohol while the temperature of the mixture was maintained below 40° C. Then carbon disulfide (76 g.) was added dropwise with cooling over a period of 30 minutes. The heavy, yellow slurry was stirred an additional hour at room temperature and filtered. The yellow residue was triturated in alcohol, collected on a filter and dried in a vacuum oven at 80° C./1 mm. for 24 hours. There was obtained 180 g. (98% yield) of the disodium salt of dicyano-1,1-ethylenedithiol, $(NC)_2C=C(SNa)_2$.

*Analysis.*—Calcd. for $C_4N_2S_2Na_2$: S, 34.40. Found: S, 32.16.

Any other alkali-metal salt can be prepared by simply substituting the appropriate alkali-metal hydroxide for sodium hydroxide in the above process.

Ammonium and substituted ammonium salts of dicyano-1,1-ethylenedithiol can be made by substituting ammonia, an amine, or a quaternary ammonium hydroxide for the alkali-metal hydroxide in the above process. For example, the bistriethylammonium salt is prepared as follows:

To a mixture of 33 g. of malononitrile, 50.4 g. of carbon disulfide, and 400 ml. of alcohol was added at 10° C. 101 g. of triethylamine. The reaction mixture was maintained at 10–15° C. by external cooling during the addition and then allowed to warm to room temperature while being stirred for one hour. Evaporation of the reaction mixture under reduced pressure gave a mixture of crystals and red oil. The residue was slurried with acetone and filtered to give 38 g. (21%) of bright-yellow, crystalline bitriethylammonium salt of dicyano-1,1-ethylenedithiol, M.P. 88–95° C. Two recrystallizations from acetone yielded a product that melted at 95.5–96.5° C.

*Analysis.*—Calcd. for $C_{16}H_{32}N_4S_2$: C, 55.78; H, 9.36; S, 18.62. Found: C, 56.48; H, 9.47; S, 18.57.

The ultraviolet spectrum of an ethyl alcohol solution of the product showed maxima at 343 m$\mu$ ($\epsilon$=24,000) and 272 m$\mu$ ($\epsilon$=10,900).

In addition to the alkali metals, a few other metals have hydroxides of sufficient basicity and solubility to permit preparation of their salts with dicyano-1,1-ethylenedithiol by this method. An example of such a metal is barium.

In going through the steps of the process of this invention, it is frequently unnecessary to isolate intermediate compounds. For example, 3,5-bis(methylthio)-4-isothiazolecarbonitrile (Formula X; R″ and R‴=CH$_3$, Z=S) can be prepared in three steps from malononitrile, carbon disulfide, and sodium hydroxide as starting materials without isolating any of the intermediate compounds (Example 19).

In the conversion of salts of dicyano-1,1-ethylenedithiol to 3,5-disubstituted-4 - isothiazolecarbonitriles (Equation 1), the oxidizing agent can be any of a number of such agents, including oxygen (pure or in the form of air); hydrogen peroxide; metal peroxides, especially alkali-metal and alkaline-earth peroxides; metal and ammonium persulfates, percarbonates, perborates, permanganates, dichromates, and perchlorates, especially alkali-metal salts of these anions; and alkali-metal ferricyanides. Because of availability, solubility, ease of handling, and ease of reaction, hydrogen peroxide is preferred.

The sulfurizing agent used alternatively in the same process can likewise be any of a number of such agents. The preferred agents are elemental sulfur and metal polysulfides, especially the alkali-metal and ammonium polysulfides. Elemental sulfur is especially preferred, because of its very easy availability.

When metal or ammonium salts are used as oxidizing or sulfurizing agents, it is usually preferred to use a compound in which the cation is the same as that in the salt of dicyano-1,1-ethylenedithiol, in order to facilitate isolation of the product and avoid the formation of mixtures of salts.

It is advantageous to use a mutual solvent for the reactants, or one that at least dissolves them to an extent that will permit reaction, e.g., 0.1%. Suitable solvents include water; alcohols such as methyl, ethyl, n-propyl, isopropyl, and 2-methoxyethyl alcohols; ethers such as tetrahydrofuran, 1,4-dioxane, 1,2-dimethoxyethane, and di(2-ethoxyethyl) ether; ketones such as acetone and methyl ethyl ketone; and nitriles such as acetonitrile and propionitrile. Water and lower alcohols are especially suitable because of their easy availability and good solvent properties. Mixtures of any of the foregoing solvents can be used, e.g., aqueous methanol or alcoholic acetone.

The reaction temperature is not critical. It will depend in part on the identity and concentration of the oxidizing or sulfurizing agent. With an oxidizing agent, temperatures between −25° C. and 125° C. can be used. The preferred oxidizing agent, hydrogen peroxide, is conveniently and usually employed at 0–50° C. With a sulfurizing agent, temperatures between 0° C. and 150° C. can be used. With the preferred sulfurizing agent, sulfur, a convenient temperature is the boiling point of a mixture of water and methanol or of water and ethanol frequently used as the solvent. Under the preferred conditions the process is usually complete in 15 minutes or less; rarely is more than one hour required.

The products can be isolated by evaporation. They are sometimes obtained at this stage as solvates, from which the solvent can be removed if desired by standard procedures such as vacuum drying at ordinary or elevated temperatures. For many purposes, they can be used directly as obtained in solution without isolation. The products in which A' is hydrogen can be isolated by acidifying the solution of the isothiazole salt with one equivalent of a mineral acid. These products are usually insoluble in the reaction medium and precipitate immediately on acidification.

The preferred products of the process just described are those represented by Formula I where Y is CN; Z is oxygen or sulfur; A is an alkali-metal or an ammonium group,

where Q, Q', Q", and Q''' are the same or different and are hydrogen or lower alkyl, lower alkenyl, cycloalkyl, or aralkyl groups, and where two of the groups Q, Q', Q", and Q''' can be joined together in a divalent alkylene group forming with the depicted nitrogen a ring of 5–7 members group, the total number of carbons in all the groups Q, Q', Q", and Q''' being 1–16; and where A' is hydrogen or the same as A. Because of low cost but for no other reason, sodium and potassium are especially preferred within of the alkali metals.

Preferred examples of A and A', in addition to hydrogen for A', thus include, for example, lithium, sodium, potassium, rubidium, cesium, ammonium, methylammonium, isopropylammonium, allylammonium, cyclopentylammonium, N-hexylammonium, 1,1,3,3 - tetramethylbutylammonium, 2-phenylethylammonium, diethylammonium, dicyclohexylammonuim, pyrrolidinium, methyl-n-octylammonium, trimethylammonium, tri-n-amylammonium, 1-ethylhexamethyleniminum, methalyldiethylammonium, tetraethylammonium, tetra-n-butylammonium and benzyltrimethylammonium.

The conversion of alkali-metal, ammonium, and substituted ammonium salts of 3,5-disubstituted-4-isothiazole-carbonitriles to the corresponding nonalkali-metal salts (Equation 2) can be carried out in solution at 0–100° C. Ordinary temperatures (20–30° C.) usually suffice and in addition minimize the possibility of side reactions. Higher temperatures can be advantageous when they bring about increased solubility of the non-alkali-metal salt. Water is a convenient solvent for the reaction. Other solvent systems of the types exemplified above for the oxidizing or sulfurizing reaction can be used if desired. Since frequently the alkali-metal, ammonium, or substituted ammonium salt is used as obtained in the reaction solution without isolation, the medium is frequently the same as that used for the preparation of this salt, plus whatever solvent is used for the nonalkali-metal salt. In general, the metals whose salts are operable in Equation 2 are those in an oxidation state having a reduction potential of less than about 1.0 volt. A definition of reduction potential and the relation between reduction potential and oxidation potential are given by Glasstone, "Textbook of Physical Chemistry," 2nd Edition, pages 939–940 (Van Nostrand, 1946). A definition of oxidation state and the relation of oxidation state to oxidation potential (and therefore to reduction potential) are given by Moeller, "Inorganic Chemistry," pages 179, 280–291 (Wiley, 1952). Oxidation potentials of typical metals are given by Moeller starting on page 286. As is made clear by Glasstone, the corresponding reduction potentials are obtained simply by reversing the signs of the oxidation potentials. The above considerations also apply to the conversion of an isothiazole derivative of Formula IX to the corresponding nonalkali-metal derivative.

Most of the products of this process are insoluble in the reaction medium and precipitate immediately as solids when the reactants are mixed. They are then recovered and dried by standard methods. A few non-alkali-metal derivatives, e.g., the barium salt of 3,5-dimercapto-4-isothiazolecarbonitrile, which are more soluble in water, are best made in a solvent system containing suitable organic solvents to lower the solubility of the nonalkali-metal derivatives. Alternatively, the barium salt of 3,5-dimercapto-4-isothiazolecarbonitrile can be made directly by sulfurization of the barium salt of dicyano-1,1-ethylenedithiol. Any nonalkali-metal salt of the type represented by Formula VIII can be made by one or both of the above methods.

In the reaction of an alkali-metal, ammonium, or substituted ammonium salt of 3,5-disubstituted-4-isothiazolecarbonitrile with an organic ester or an organic mixed anhydride of an inorganic acid (Equations 3, 4, and 5), the preferred acid anions are chloride, bromide, iodide, and sulfate. Organic sulfites and sulfonates can also be used in some cases.

The range of organic groups (R" and R''' in Equations 3, 4, and 5 and hence A and A' of Formula I) that can be used is extremely broad. It includes any organic group that is devoid of peroxidic (—O—O—) groups and of aliphatic iodine or sulfate, and in which the free bond is connected to a carbon free of carbon-carbon unsaturation. For reasons of availability, the preferred R″ and R‴ groups are those defined as above and containing 1–12 carbons. In general, these groups include aliphatic hydrocarbyl, e.g., methyl, ethyl, isopropyl, allyl, n-octyl; (lower alkyl), e.g., benzyl, 2-phenylethyl, 1-naphthylmethyl, and acyl,

where T is lower alkyl, amino or lower alkyl-substituted amino, e.g., acetyl, isobutyryl, benzoyl, 2-naphthoyl, 4-toluoyl, carbamoyl, dimethylcarbamoyl.

It is advantageous to use a solvent in this process; examples of solvents or combinations of solvents that can be used are in the group listed for the basic oxidizing or sulfurizing reaction. In many cases, the solution of the alkali-metal, ammonium, or substituted ammonium salt obtained by the process of Equation 1 is used without removal of solvent. One skilled in the art will appreciate that certain solvents are to be avoided for certain reactants; for example, solvents containing free hydroxyl groups (water and alcohols) react with aliphatic acid halides (e.g., acetyl chloride), and therefore inert solvents such as 1,2-dimethoxyethane or acetonitrile are preferred for reactions involving such halides. In addition to the solvents noted above, hydrocarbons such as benzene or heptane can be used, but are less preferred since they are generally poor solvents for the isothiazole reactant.

Within rather wide limits, temperature is not critical; the process can be operated at from —25° C. to 175° C. Most of the reactions are conveniently carried out between 0° C. and 100° C., lower temperatures in this range being used for more reactive compounds such as dimethyl sulfate, allyl bromide, and acetyl chloride, and the higher temperatures for relatively less reactive compounds. Higher temperatures, up to the decomposition points of the products, can be used and may be advantageous in some cases. The process is usually complete in from 15 minutes to several hours under the preferred conditions. Frequently the course of the reaction can be followed by observing the dissolution of one or both reactants or the precipitation of one or both products. The products are solids, usually insoluble in water, and can be isolated by well-known methods, including filtration, precipitation with a nonsolvent, and evaporation. The by-product compounds (M′ᵤX in Equations 3, 4, and 5) can be removed, if necessary, by washing with water.

All the processes of this invention can be conducted in standard chemical apparatus at atmospheric pressure or the autogenous pressures of closed systems. Higher or lower pressures can be used but confer no advantage.

PROPERTIES

The products of this invention are, for the most part, crystalline solids. Some of the products of Formula I where A and A′ are ammonium or substituted ammonium groups are inherently liquid at ordinary temperatures or are produced as liquids that are hard to crystallize. This property does not interfere with their use as chemical intermediates and in other fields. The products of Formula I where A is an organic group and A′ is hydrogen or an organic group recrystallize well from suitable solvents and have sharp melting points. All the products except some of those in which A or both A and A′ are non-alkali metals are soluble in suitable solvents. The alkalimetal, ammonium, and substituted ammonium derivatives dissolve readily in solvents such as water, methanol, and acetonitrile; the organic derivatives, in solvents such as ethanol, acetone, benzene, and chloroform. There is no sharp demarcation of solubility; some products dissolve in both types of solvents listed above.

The following nonlimiting examples illustrate the products and processes of this invention. In these examples all pressures are ambient unless otherwise noted.

*Example 1.*—*Disodium salt of 3-hydroxy-5-mercapto-4-isothiazolecarbonitrile*

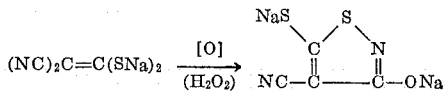

To a solution of 46.5 g. of the disodium salt of dicyano-1,1-ethylenedithiol in 250 ml. of distilled water was added at 10° C. 28.3 g. of 30% hydrogen peroxide over a period of 30 minutes. The reaction mixture was allowed to warm to room temperature over another 30 minutes and was then evaporated to dryness in vacuum. After drying in a vacuum oven at 85° C./1 mm. over phosphorus pentoxide, there was obtained 48.9 g. (97% yield) of the disodium salt of 3-hydroxy-5-mercapto-4-isothiazolecarbonitrile. A sample was recrystallized from methanol/ethanol/ether and dried two days at 85° C. at 1 mm. over phosphoric anhydride for analysis.

*Analysis.*—Calcd. for $C_4S_2N_2ONa_2$: C, 23.76; H, 0; S, 31.72; Na, 22.8; M.W., 202.2. Found: C, 22.39; H, 1.02; S, 31.33; Na, 21.1±2%.

The ultraviolet spectrum of the product in methanol solution showed maxima at 320μ (ε=13,300), 290 mμ (ε=9,800), and 213 mμ (ε=11,000). The infrared spectrum showed bands at 3.0μ and 6.15μ for $H_2O$, and strong bands at 6.65μ and 7.6μ.

*Example 2.*—*Dipotassium salt of 3-hydroxy-5-mercapto-4-isothiazolecarbonitrile*

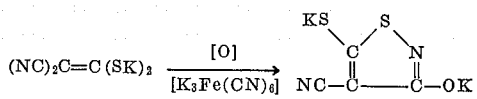

To a solution of 4.36 g. of the dipotassium salt of dicyano-1,1-ethylenedithiol in 25 ml. of water was added dropwise a solution prepared from 12.6 g. of potassium ferricyanide and 2.64 g. of potassium hydroxide in 70 ml. of water at room temperature. There was thus formed a solution of the dipotassium salt of 3-hydroxy-5-mercapto-4-isothiazolecarbonitrile. That this product was formed was shown as follows. A portion of the reaction mixture was transferred to a small flask and shaken vigorously with a small portion of dimethyl sulfate. Dilute sodium hydroxide solution was added as required to redissolve precipitated solid. There was thus formed a solution of a mixture of the sodium and potassium salts of 3-hydroxy-5-methylthio-4-isothiazolecarbonitrile. The aqueous solution was extracted three times with methylene chloride. Acidification of the aqueous phase with dilute hydrochloric acid caused precipitation of a white solid that melted at 238–240° C. This product was identified by comparison of its infrared spectrum with that of an authentic sample as 3-hydroxy-5-methylthio-4-isothiazolecarbonitrile (Example 11).

*Example 3.*—*Bistriethylammonium salt of 3-hydroxy-5-mercapto-4-isothiazolecarbonitrile*

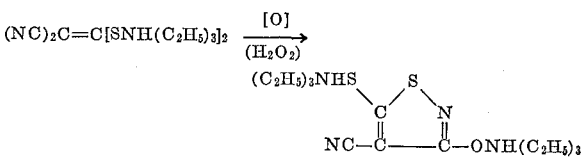

To a solution of 3.42 g. of the bistriethylammonium salt of dicyano-, 1-ethylenedithiol in 15 ml. of water at 0–10° C. was added 1.12 g. of 30% hydrogen peroxide in 5 ml. of water. The reaction mixture was stirred 30 minutes while warming to room temperature and was then evaporated under reduced pressure. The nonvolatile material was the bistriethylammonium salt of 3-hydroxy-5-mercapto-4-isothiazolecarbonitrile, which was obtained as a liquid. The identity of the product was shown as follows. The ultraviolet spectrum, measured in aqueous solution, had maxima at 311 mµ ($\epsilon$=14,300) and 290 mµ ($\epsilon$=13,200), which suggested the hydroxymercaptoisothiazole structure. Treatment of an aqueous solution of a small portion of the salt with dimethyl sulfate, followed by filtration and acidification of the filtrate, yielded crystals of 3-hydroxy-5-methylthio-4-isothiazolecarbonitrile, identified by comparison of its infrared spectrum with that of an authentic sample (Example 11).

*Example 4.—Disodium salt of 3,5-dimercapto-4-isothiazolecarbonitrile*

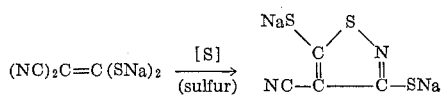

A mixture of 16.0 g. of the disodium salt of dicyano-1,1-ethylenedithiol, 200 ml. of methanol, and 2.9 g. of sulfur was heated under reflux for 30 minutes and then filtered from a little insoluble material and evaporated to dryness at reduced pressure. The residue was taken up in 100 ml. of hot ethyl alcohol, and the solution was cooled and diluted wth ethyl acetate and ethyl ether to precipitate the tetrahydrate of the disodium salt of 3,5-dimercapto-4-isothiazolecarbonitrile as a crystalline solid. The product, collected in three fractions, weighed 18.9 g. after drying in air. An analytical sample was recrystallized from mixture of isopropyl alcohol and benzene.

*Analysis.*—Calcd. for $C_4N_2S_3Na_2 \cdot 4H_2O$: C, 16.57; H, 2.78; S, 33.17; N, 9.66. Found: C, 16.62; H, 3.11; S, 32.50; N, 9.90.

Drying in a vacuum oven at 80° C. and 1 mm. of mercury pressure in the presence of phosphoric anhydride gave the anhydrous disodium salt of 3,5-dimercapto-4-isothiazolecarbonitrile.

*Analysis.*—Calcd. for $C_4N_2S_3Na_2$: C, 22.02; H, 0; S, 44.08; N, 12.84. Found: C, 22.09; H, 0.56; S, 42.83; N, 12.70.

The ultraviolet absorption spectrum of a 0.1% solution in water showed the following maxima: 330 mµ ($\epsilon$=7070), 303 mµ ($\epsilon$=12,900), 260 mµ ($\epsilon$=10,500), sh. 240 mµ ($\epsilon$=9250), and 218 mµ ($\epsilon$=14,300).

*Example 5.—Bistriethylammonium salt of 3,5-dimercapto-4-isothiazolecarbonitrile*

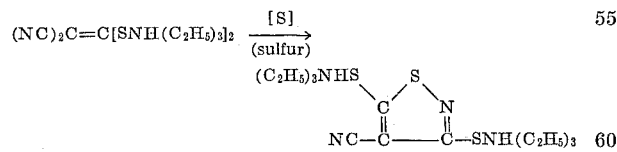

A solution of the bistriethylammonium salt of dicyano-1,1-ethylenedithiol in ethyl alcohol was prepared by the method described above. A portion of the solution was mixed with an excess of sulfur, boiled on a water bath 15 minutes, and filtered from undissolved sulfur. There was thus formed a solution of the bistriethylammonium salt of 3,5-dimercapto-4-isothiazolecarbonitrile. The identity of the product was shown as follows. Benzyl bromide was added to the solution, which was then boiled 10 minutes and diluted with water. The precipitated solid, after recrystallization from methanol, melted at 95–96° C. The product was shown to be identical to an authentic sample of 3,5-bis(benzylthio)-4-isothiazolecarbonitrile (Example 20) by the melting point of a mixture.

*Example 6.—Lead salt of 3-hydroxy-5-mercapto-4-isothiazolecarbonitrile*

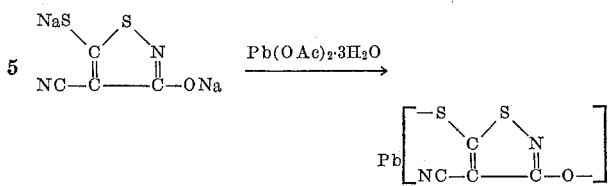

A solution of the disodium salt of 3-hydroxy-5-mercapto-4-isothiazole was prepared by the method of Example 1 from 46.5 g. of the disodium salt of dicyano-1,1-ethylenedithiol in 250 ml. of water and 28.3 g. of 30% hydrogen peroxide. One quarter of the above solution was mixed with a solution of 23.7 g. of lead acetate trihydrate in 250 ml. of water. The yellow precipitate which formed was collected on a filter, triturated in methanol and again collected on a filter. After drying in a vacuum oven and heating at 80° C./1 mm./$P_2O_5$, there was obtained 20.1 g. of the lead salt of 3-hydroxy-5-mercapto-4-isothiazolecarbonitrile (theoretical weight 18.7 g.). Yield and analysis indicated that the product was hydrated.

*Analysis.*—Calcd. for $C_4N_2OS_2Pb$: S, 21.1; Pb, 68.2. Found: S, 15.45; Pb, 56.44.

*Example 7.—Silver salt of 3-hydroxy-5-mercapto-4-isothiazolecarbonitrile*

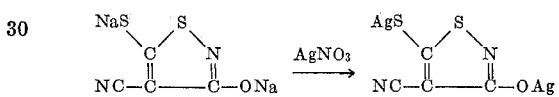

A second quarter of the solution of the disodium salt of 3-hydroxy-5-mercapto-4-isothiazolecarbonitrile described in Example 6 was mixed with an aqueous solution of 21.2 g. of silver nitrate to give a yellow precipitate of the disilver salt of 3-hydroxy-5-mercapto-4-isothiazolecarbonitrile, which weighed 22.4 g. after oven-drying at 80° C. in a vacuum over phosphoric anhydride.

*Analysis.*—Calcd. for $C_4ON_2S_2Ag_2 \cdot 3H_2O$: S, 17.6; Ag, 58.8. Found: S, 15.58; Ag, 58.21.

*Example 8.—Mercuric salt of 3-hydroxy-5-mercapto-4-isothiazolecarbonitrile*

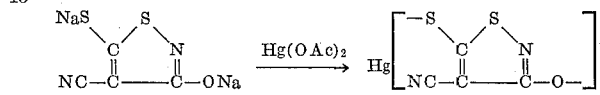

By the method of Example 7, from 19.19 g. of mercuric acetate in 500 ml. of water and another quarter of the solution of the disodium salt of 3-hydroxy-5-mercapto-4-isothiazolecarbonitrile of Example 6 was obtained 20.1 g. of bright yellow mercuric salt of 3-hydroxy-5-mercapto-4-isothiazolecarbonitrile after drying in vacuo.

*Analysis.*—Calcd. for $C_4N_2OS_2Hg \cdot 5H_2O$: S, 16.6; Hg, 52.0. Found: S, 16.43; Hg, 52.90.

*Example 9.—Silver salt of 3,5-dimercapto-4-isothiazolecarbonitrile*

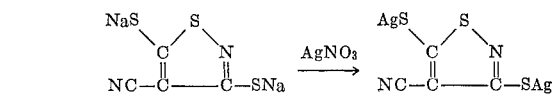

To a solution of 8.7 g. of the disodum salt of 3,5-dimercapto-4-isothiazolecarbonitrile in 150 ml. of water was added a solution of 13.5 g. of silver nitrate in 200 ml. of water. The yellow precipitate that formed immediately was collected on a filter, washed successively with hot alcohol, hot ethyl acetate and hot acetone, and dried in air to give 14 g. (90%) of the silver salt of 3,5-dimercapto-4-isothiazeloecarbonitrile as an insoluble yellow powder. An analytical sample was dried over phosphoric anhydride at 50° C. under reduced pressure.

*Analysis.*—Calcd. for $C_4H_2S_3Ag_2 \cdot 3H_2O$: C, 10.87; H, 1.37; N, 6.34; S, 21.76. Found: C, 10.66; H, 0.42; N, 6.82; S, 20.49.

Other nonalkali-metal salts of 3,5-dimercapto-4-isothiazolecarbonitrile were also prepared in this way, except that the solution of the disodium salt of 3,5-dimercapto-4-isothiazolecarbonitrile was added to the solution of the salt of the nonalkali-metal salt. By this method, the stannous salt of 3,5-dimercapto-4-isothiazolecarbonitrile was obtained as a bulky orange solid from stannous chloride; the stannic salt, as a yellow solid from stannic chloride; the lead salt, as a fluocculent yellow solid from lead acetate; the ferric salt, as a dark-yellow solid from ferric chloride; the cuprous salt, as a yellow solid from cuprous chloride (in ammoniacal solution); and the cupric salt, as a yellow solid from cupric sulfate.

*Example 10.*—Barium salt of 3,5-dimercapto-4-isothiazolecarbonitrile

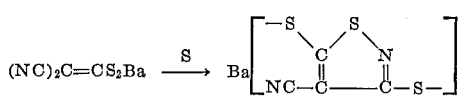

A slurry of 2.77 g. of the barium salt of dicyano-1,1-ethylenedithiol and 0.32 g. of sulfur in 50 ml. of methanol and 20 ml. of water was boiled for 15 minutes, filtered from a little insoluble material and evaporated to dryness. The yellow residue weighed 2.8 g. and was the barium salt of 3,5-dimercapto-4-isothiazolecarbonitrile. The ultraviolet spectrum of the product, measured in aqueous solution, was similar to that of the corresponding sodium salt, with maxima at 260 mμ ($\epsilon$=8480), 303 mμ ($\epsilon$=11,600), and 330 mμ ($\epsilon$=5160).

*Example 11.*—3-hydroxy-5-methylthio-4-isothiazolecarbonitrile

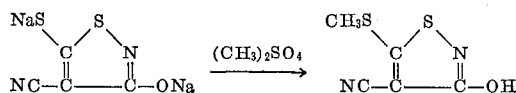

Hydrogen peroxide (4.5 g. of 30%) was added dropwise to a solution of 7.44 g. of the disodium salt of dicyano-1,1-ethylenedithiol in 50 ml. of water at 20° C., and the mixture was stirred at this temperature for 30 minutes. Dimethyl sulfate was added in 1-ml. portions to the resulting solution of the disodium salt of 3-hydroxy-5-mercapto-4-isothiazolecarbonitrile with vigorous shaking until the mixture became acidic. The solid that appeared was separated by filtration. Concentration of the mother liquor yielded 0.5 g. of slightly yellow, crystalline 3-hydroxy-5-methylthio-4-isothiazolecarbonitrile, M.P. 225–232° C. An analytical sample recrystallized from a methanol-benzene mixture melted at 237–242° C.

*Analysis.*—Calcd. for $C_5H_4N_2OS_2$: C, 34.87; H, 2.34; N, 16.27; S, 37.25. Found: C, 34.93; H, 2.43; N, 16.20; S, 37.25.

The infrared spectrum of the product had peaks at 3.4μ, 3.65μ (S), 3.75μ (S), 3.85μ (S), 4.5μ, 6.1μ, 6.45μ, and 6.65μ. The ultraviolet spectrum, measured in ethyl alcohol solution, showed maxima at 277 mμ ($\epsilon$=11,500) and 375 mμ (reaction with solvent).

*Example 12.*—3-hydroxy-5-methylthio-4-isothiazolecarbonitrile

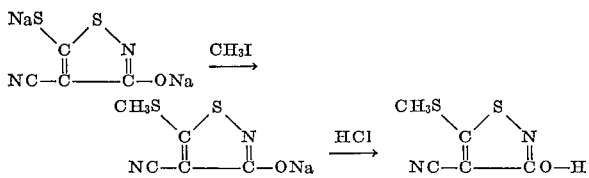

To a solution of 10.1 g. of the disodium salt of 3-hydroxy-5-mercapto-4-isothiazolcarbonitrile in 150 ml. of methanol was added dropwise over 15 minutes at room temperature a solution of 7.1 g. of methyl iodide in 20 ml. of methanol. The mixture was stirred one hour at room temperature and 3.5 hours at 25–40° C. There was thus obtained a solution of the sodium salt of 3-hydroxy-5-methylthio-4-isothiazolecarbonitrile. Concentration on the steam bath and dilution with 100 ml. of water produced no precipitate. Acidification with dilute hydrochloric acid caused formation of a white precipitate of 3-hydroxy-5-methylthio-4-isothiazolecarbonitrile, which was collected on a filter and recrystallized from aqueous methanol, with treatment with decolorizing carbon. The product weighed 5.61 g. (71% yield), M.P. 238–240° C. (inserted at 238° C.). By the method of mixed melting points and by infrared absorption spectrum analyses, the compound was shown to be identical with the product of Example 11.

*Example 13.*—5-benzylthio-3-hydroxy-4-isothiazolecarbonitrile

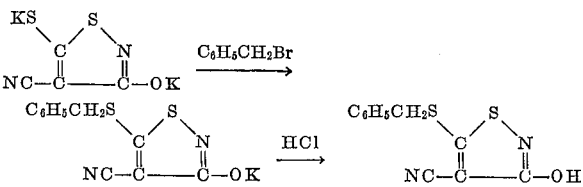

To a solution of 11.0 g. of the dipotassium salt of 3-hydroxy-5-mercapto-4-isothiazolecarbonitrile in 150 ml. of methanol was added 8.6 g. of benzyl bromide. The mixture was heated under reflux for two hours and then allowed to stand overnight. The reaction mixture was evaporated under reduced pressure, and the residue was slurried with ethyl ether and aqueous sodium hydroxide. The aqueous layer of the resulting mixture was a solution of the potassium and sodium salts of 5-benzylthio-3-hydroxy-4-isothiazolecarbonitrile. Separation of the aqueous layer and acidification with dilute hydrochloric acid yielded 4.9 g. of white, crystalline 5-benzylthio-3-hydroxy-4-isothiazolecarbonitrile, M.P. 142–145° C. Recrystallization from aqueous methanol after treatment with decolorizing charcoal yielded a product which melted at 152.6–154.6° C.

*Analysis.*—Calcd. for $C_{11}H_8N_2OS_2$: C, 53.20; H, 3.25; S, 25.83. Found: C, 53.24; H, 3.54; S, 25.62.

The infrared absorption showed broad absorption in the 3 micron region for hydrogen-bonded keto-enol, absorption at 4.47μ (conj. CN) and strong bands at 6.05 mμ, 6.45 mμ, 6.70 mμ, and 7.65 mμ. The ultraviolet absorption spectrum, measured in ethyl alcohol solution, showed a maximum at 270μ ($\epsilon$=10,500).

*Example 14.*—Sodium salt of 3-mercapto-5-methylthio-4-isothiazolecarbonitrile

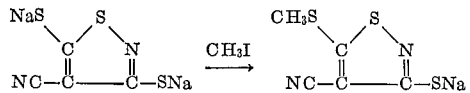

A solution of 3.35 g. of the disodium salt of 3,5-dimercapto-4-isothiazolecarbonitrile in 2.5 ml. of methanol was mixed with 2.3 g. of methyl iodide, and the mixture was stirred at room temperature for two hours. The mixture was filtered from 0.3 g. of crystalline solid, identified as 3,5-bis(methylthio)-4-isothiazolecarbonitrile. The filtrate was evaporated to dryness and the residue was triturated with ethyl ether and filtered to give 4.4 g. of tan, powdered sodium salt of 3-mercapto-5-methylthio-4-isothiazolecarbonitrile. The infrared spectrum of this product showed the absence of starting material. The product was readily soluble in water.

Nonalkali-metal salts of 3-mercapto-5-methylthio-4-isothiazolecarbonitrile precipitated immediately when solutions of the sodium salt were mixed with aqueous solutions of the salts of nonalkali metals. This method gave the silver salt as a light-yellow solid, the mercuric

Example 15.—5-benzylthio-3-mercapto-4-isothiazole-carbonitrile

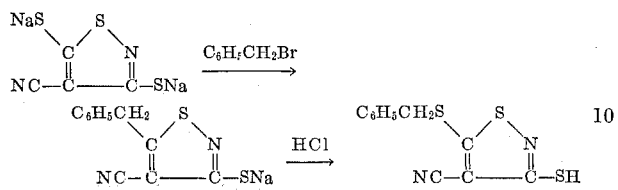

To a solution of 14.5 g. of the disodium salt of 3,5-dimercapto-4-isothiazolecarbonitrile tetrahydrate in 500 ml. of methanol was added at 40–50° C. a solution of 11.97 g. of benzyl bromide in 25 ml. of methanol over 15 minutes. The mixture was stirred 90 minutes and filtered from 6.4 g. of white needles, identified as 3,5-bis(benzylthio)-4-isothiazolecarbonitrile. The filtrate, after evaporation and trituration in ethyl ether, gave 12.7 g. of ether-insoluble salts. A portion of this material (8.6 g.) was triturated in 150 ml. of hot acetone. The insoluble portion (2.97 g.) was sodium bromide. Evaporation of the acetone solution and trituration of the residue in ethyl ether gave the sodium salt of 5-benzylthio-3-mercapto-4-isothiazolecarbonitrile as a solid, whose IR spectrum was different from that of starting material. One gram of the latter product was dissolved in 10 ml. of water, and the solution was acidified with 4 ml. of 1 N hydrochloric acid. Acidification caused the formation of some insoluble yellow solid, which was separated by filtration. The mixture was extracted with ethyl ether to give an ether solution of 5-benzylthio-3-mercapto-4-isothiazolecarbonitrile. The identity of the product was shown as follows. The ether solution was extracted with aqueous sodium hydroxide. Evaporation of the aqueous solution gave a solid residue that was taken up in methanol and treated with benzyl bromide to form a white crystalline solid, which was shown by mixed melting point to be the 3,5-bis(dibenzylthio)-4-isothiazolecarbonitrile of Example 20.

Example 16.—3-benzyloxy-5-methylthio-4-isothiazolecarbonitrile

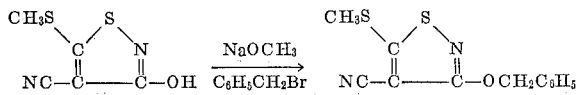

To a slurry of 4.0 g. of 3-hydroxy-5-methylthio-4-isothiazolecarbonitrile in 80 ml. of methanol was added 16.1 ml. of a solution of 1.44 N sodium methylate in methanol. With continued stirring, 3.98 g. of benzyl bromide in 20 ml. of methanol was added, and the mixture was heated 30 minutes under reflux. Evaporation of the solvent gave oily crystals. The mixture was triturated in water and filtered. Extraction of the filtrate with ethyl ether, drying and evaporation of the ethereal phase gave 1.8 g. of oily crystalline mixture. Recrystallization from hot cyclohexane yielded long yellow needles of 3-benzyloxy-5-methylthio-4-isothiazolecarbonitrile melting at 72–73° C.

*Analysis.*—Calcd. for $C_{12}H_{10}ON_2S_2$: C, 54.94; H, 3.85. Found: C, 55.12; H, 3.92.

The ultraviolet spectrum of an ethyl alcohol solution of the product showed a maximum at 275 m$\mu$ ($\epsilon$=14,300). The infrared spectrum was consistent with the above structure, with peaks at 3.3$\mu$ (=CH), 3.4$\mu$ (sat. CH), 4.5$\mu$ (conj. C≡N), 6.3$\mu$, 6.45$\mu$, 6.6$\mu$ and 6.65$\mu$ (conj. C=C and/or C=N), 7.4$\mu$, and 9.75$\mu$ (C—O).

The product of this example can be converted to 3-benzyloxy-5-methylsulfinyl-4-isothiazolecarbonitrile and to 3-benzyloxy-5-methylsulfonyl-4-isothiazolecarbonitrile by oxidation with hydrogen peroxide in acetic acid.

Example 17.—3-benzyloxy-5-benzylthio-4-isothiazolecarbonitrile

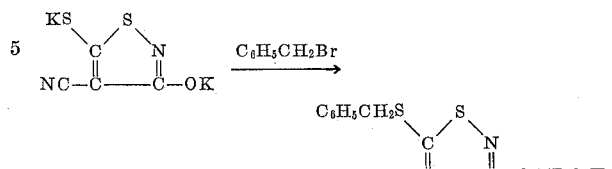

To a solution of 11 g. of the dipotassium salt of 3-hydroxy-5-mercapto-4-isothiazolecarbonitrile in 200 ml. of methanol was added dropwise 17.1 g. of benzyl bromide. The mixture was heated under reflux for two hours and allowed to stand overnight. Evaporation under reduced pressure gave an oily residue, which was taken up in ethyl ether and water. The ether layer was washed with water, with aqueous sodium hydroxide and again with water, and evaporated to give 8.0 g. of an oil. Trituration of the oil in methanol gave 1.80 g. of crystalline 3-benzyloxy-5-benzylthio-4-isothiazolecarbonitrile, M.P. 111–117° C. Recrystallization from methanol raised the melting point to 117.4–118° C.

*Analysis.*—Calcd. for $C_{18}H_{14}ON_2S_2$: C, 63.88; H, 4.18; S, 18.95. Found: C, 64.14; H, 4.51; S, 18.75.

The ultraviolet absorption spectrum of an ethyl alcohol solution of the product showed a maximum at 278 m$\mu$ ($\epsilon$=14,000). The infrared spectrum was consistent with the above structure, with peaks at 3.25$\mu$ (=CH), 3.4$\mu$ (sat. CH), 4.50$\mu$ (C≡N), 6.6$\mu$ (C=C), 7.0$\mu$, 7.35$\mu$, 9.65$\mu$, and 9.75$\mu$ (C—O—C).

Example 18.—3,5-bis(methylthio)-4-isothiazolecarbonitrile

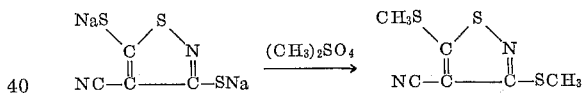

A solution of the disodium salt of 3,5-dimercapto-4-isothiazolecarbonitrile was prepared as follows. To a hot solution of 1.86 g. of the disodium salt of dicyano-1,1-ethylenedithiol in 25 ml. of methanol was added 0.32 g. of sulfur. The mixture was boiled 15 minutes, diluted with 30 ml. of water, and concentrated by boiling to a volume of 25 ml. The cooled solution was shaken vigorously with dimethyl sulfate added in small portions, and the precipitate that formed was collected on a filter. Recrystallization from methanol gave fine white needles of 3,5-bis(methylthio)-4-isothiazolecarbonitrile that melted at 131–131.5° C.

*Analysis.*—Calcd. for $C_6H_6N_2S_3$: C, 35.64; H, 2.99; S, 47.55. Found: C, 35.80; H, 2.91; S, 47.96.

The ulraviolet and infrared spectra were consistent with the above structure. The ultraviolet spectrum, measured in ethyl alcohol solution, had maxima at 284 m$\mu$ ($\epsilon$=13,300), 230 m$\mu$ ($\epsilon$=11,700), and 215 m$\mu$ ($\epsilon$=11,100)

The infrared spectrum showed strong absorption at 4.5$\mu$ (CN), 6.8$\mu$, 7.55–7.60$\mu$, 10.5$\mu$, and 12.25$\mu$.

Example 19.—3,5-bis(methylthio)-4-isothiazole carbonitrile

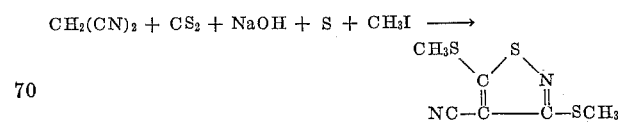

A mixture of 40 g. of sodium hydroxide and 600 ml. of methanol was cooled to 10–20° C., mixed with 33 g. of malonitrile, and stirred for 40 minutes. To the solution was added dropwise 38 g. of carbon disulfide at 10–20° C., and the reaction mixture was allowed to warm to room temperature while being stirred for 30 minutes. Powdered sulfur (16 g.) was added and the mixture was heated under reflux for 15 minutes and then cooled to 40° C. Methyl iodide (150 g.) was added and the mixture was heated under reflux 30 minutes, then cooled. The precipitated needles of 3,5-bis(methylthio)-4-isothiazolecarbonitrile were collected on a filter and washed with methanol, weight 48 g., M.P. 131.5–133° C. Concentration of the filtrate, dilution with water, and cooling yielded an additional 7.5 g. of product. The total yield of 3,5-bis(methylthio)-4-isothiazolecarbonitrile was 55% of the theoretical.

*Example 20.—3,5-bis(benzylthio)-4-isothiazole carbonitrile*

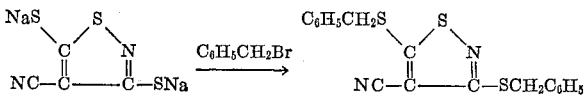

A solution of the disodium salt of dicyano-1,1-ethylenedithiol was prepared by refluxing a mixture of 9.3 g. of the disodium salt of dicyano-1,1-ethylenedithiol, 1.6 g. of sulfur, and 150 ml. of methanol for 15 minutes and filtering from traces of sulfur. To the refluxing solution was added over 30 minutes a solution of 17.1 g. of benzyl bromide in 100 ml. of methanol. The mixture was refluxed with stirring another hour and then cooled in an ice bath. The white crystalline precipitate of 3,5-bis-(benzylthio)-4-isothiazolecarbonitrile, after collecting and drying in air, weighed 17 g. (97% yield). Recrystallization from methanol gave a product melting at 96–97.5° C.

*Analysis.*—Calcd. for $C_{18}H_{14}N_2S_3$: C, 60.99; H, 3.99; S, 27.14. Found: C, 60.69; H, 4.21; S, 27.60.

The infrared absorption spectrum of the product showed peaks at $4.5\mu$ (CN), $6.25\mu$, $6.3\mu$, $6.7\mu$ weak (aromatic bands), $6.85\mu$ (C=C), and $7.55\mu$ (—C=NS). The ultraviolet absorption spectrum, measured in ethyl alcohol solution, showed a maximum at 287 m$\mu$ ($\epsilon=13,600$).

*Example 21.—3,5 - bis(allylthio)-4-isothiazolecarbonitrile*

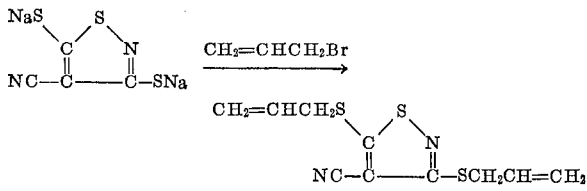

A solution of 24.1 g. of allyl bromide in 25 ml. of methanol was added over 30 minutes to a stirred solution of 21.8 g. of 3,5-disodiomercapto-4-isothiazolecarbonitrile in 200 ml. of methanol maintained at 35° C. by slight cooling. The reaction mixture was stirred an additional 30 minutes, concentrated to 150 ml. by evaporation on a water bath, diluted with an equal volume of water and cooled in an ice bath. Filtration gave 19.5 g. (83% yield) of brownish crystals of 3,5-bis(allylthio)-4-isothiazolecarbonitrile. Recrystallization from aqueous methanol and then from a mixture of cyclohexane and petroleum ether gave 15.7 g. (67% yield) of white platelets, M.P. 41.6–42.4° C.

*Analysis.*—Calcd. for $C_{10}H_{10}N_2S_3$: C, 47.09; H, 3.95; N, 10.99. Found: C, 47.41; H, 3.86; N, 11.03.

The infrared spectrum was consistent with the above structure: $3.25\mu$ (=CH), $3.35\mu$ and $3.45\mu$ (sat. CH), $4.5\mu$ (conj. C≡N), $6.1\mu$ (C=C), $6.8\mu$ and $7.55\mu$ (isothiazole ring absorptions), $10.15\mu$ and $10.75\mu$ (—CH=CH$_2$). The ultraviolet spectrum of an ethyl alcohol solution of the product showed maxima at 286 m$\mu$ ($\epsilon=11,600$) and 229 m$\mu$ ($\epsilon=13,000$).

*Example 22.—3,5-bis(carboxymethylthio)-4-isothiazolecarbonitrile*

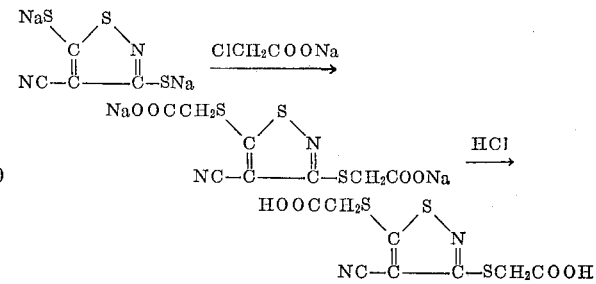

Solid sodium chloroacetate, prepared by mixing 9.45 g. of chloroacetic acid with 5.3 g. of sodium carbonate in water and evaporating the mixture to dryness, was dissolved in 100 ml. of methanol and mixed with a methanol solution of the disodium salt of 3,5-dimercapto-4-isothiazolecarbonitrile, prepared by boiling a solution of 9.3 g. of the disodium salt of dicyano-1,1-ethylenedithiol with 1.6 g. of sulfur and ethyl alcohol for 15 minutes. The reaction mixture was stirred under reflux for one hour, filtered from a trace of insoluble material, and evaporated under reduced pressure. The residue, which contained the disodium salt of 3,5-bis(carboxymethylthio)-4-isothiazolecarbonitrile, was taken up in water and acidified with dilute hydrochloric acid, and the solution was evaporated to dryness. Trituration of the residue with acetone and filtration gave 9.2 g. of acetone-insoluble material, which was discarded. Evaporation of the acetone solution gave an oil that subsequently crystallized. Recrystallization from water yielded 9.3 g. (64% yield) of slightly yellow, solid 3,5-bis(carboxymethylthio)-4-isothiazolecarbonitrile, M.P. 140–150° C. An analytical sample recrystallized from water melted at 156.5–157.5° C.

*Analysis.*—Calcd. for $C_8H_6O_4N_2S_3$: C, 33.10; H, 2.09; S, 33.13. Found: C, 33.14; H, 2.20; S, 32.76.

The infrared spectrum was consistent with the above structure: $4.5\mu$ (C≡N), broad absorption in 3–4$\mu$ region along with $5.8\mu$ (carboxylic acid), and $6.75\mu$ (conj. C=C and/or C=N). The ultraviolet spectrum of an ethyl alcohol solution of the product showed maxima at 227 m$\mu$ ($\epsilon=13,200$) and 285 m$\mu$ ($\epsilon=11,900$).

*Example 23.—3-benzoyloxy-5-benzoylthio-4-isothiazolecarbonitrile*

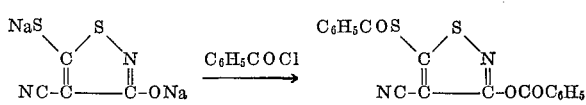

To a slurry of 10 g. of the disodium salt of 3-hydroxy-5-mercapto-4-isothiazolecarbonitrile in 400 ml. of tetrahydrofuran was added 14 g. of benzoyl chloride dropwise over 15 minutes. The reaction mixture was stirred for five hours, allowed to stand overnight, and filtered. Evaporation of filtrate and trituration with ethyl ether gave 8.7 g. of ether-insoluble solid. Extraction of the solid with ether and with hot benzene and evaporation of the solvents yielded 7.1 g. of orange crystals of 3-benzoyloxy-5-benzoylthio-4-isothiazolecarbonitrile, M.P. 166–167° C. Recrystallization from benzene after treatment with decolorizing charcoal gave white crystals that melted at 169–170.5° C.

*Analysis.*—Calcd. for $C_{18}H_{10}O_3N_2S_2$: C, 59.00; H, 2.76. Found: C, 59.52, 59.36; H, 3.02, 3.24.

The infrared spectrum of the product showed absorption at $5.7\mu$ (C=O of benzoate ester) and $6.0\mu$ (C=O of thiol ester). The ultraviolet absorption spectrum in ethyl alcohol showed maxima at 292 m$\mu$ ($\epsilon=17,000$) and 238 m$\mu$ ($\epsilon=27,300$).

Example 24.—3,5-bis(acetylthio)-4-isothiazole-carbonitrile

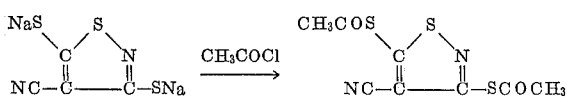

To a mixture of 70 ml. of acetyl chloride and 100 ml. of acetonitrile stirred at room temperature was added portionwise a slurry of 10.9 g. of the disodium salt of 3,5-dimercapto-4-isothiazolecarbonitrile in 100 ml. of acetonitrile. The reaction mixture was stirred 30 minutes after the addition was completed, filtered, and concentrated by evaporation. The concentrate was diluted with benzene, washed with water, and evaporated to give an oily residue that crystallized on cooling. Crystallization from benzene gave 7.6 g. (43% yield) of light-yellow, crystalline 3,5-bis(acetylthio)-4-isothiazolecarbonitrile that melted at 107–108° C. An analytical sample melted at 111–112° C.

*Analysis.*—Calcd. for $C_8H_6O_2N_2S_3$: C, 37.19; H, 2.34. Found: C, 37.95; H, 2.76.

The infrared spectrum was consistent with the above structure: $3.4\mu$ (sat. CH), $4.45\mu$ (C≡N), $5.82\mu$ (C=O), $6.8\mu$ and $7.50\mu$ (cyclic C=C and/or C=N). The infrared spectrum of a methylene chloride solution of the product showed a maximum at 277 m$\mu$ ($\epsilon$=12,080).

Example 25.—3,5-bis(benzoylthio) 4-isothiazolecarbonitrile

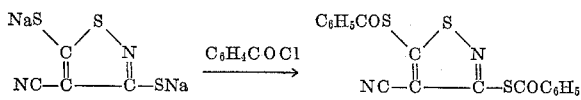

A solution of 10.9 g. of the disodium salt of 3,5-dimercapto-4-isothiazolecarbonitrile in 150 ml. of distilled water and 25 ml. of ethyl alcohol was shaken vigorously as 14.0 g. of benzoyl chloride was added portionwise. Addition required about 15 minutes. The reaction mixture was shaken occasionally for another 30 minutes and then filtered. The air-dried solid weighed 16 g. Recrystallization from benzene gave 10.6 g. (53% yield) of crystalline 3,5-bis(benzoylthio)-4-isothiazole-carbonitrile that melted at 149–153° C. Three recrystallizations from benzene gave white crystals, M.P. 157.5–158.5° C.

*Analysis.*—Calcd. for $C_{18}H_{10}N_2O_2S_3$: C, 56.82; H, 2.65. Found: C, 56.84; H, 2.94.

The infrared absorption spectrum was consistent with the above structure: $3.25\mu$ (=CH), $4.47\mu$ (C≡N), $5.91\mu$–$5.98\mu$ (C=O), $6.25\mu$, $6.3\mu$, 6.8 and $6.9\mu$ (arom. C=C and/or C=N). The ultraviolet absorption spectrum of an ethyl alcohol solution of the product had maxima at 249 m$\mu$ ($\epsilon$=20,600), 282 m$\mu$ ($\epsilon$=14,600), and 288 m$\mu$ ($\epsilon$=14,500).

Example 26.—3,5-bis(dimethylcarbamoylthio) 4-isothiazolecarbonitrile

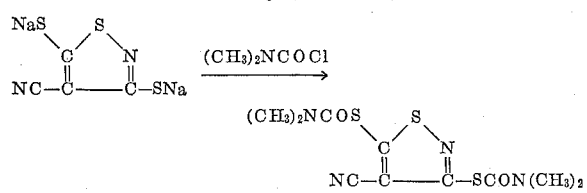

To a solution of 10.9 g. of the disodium salt of 3,5-dimercapto-4-isothiazolecarbonitrile in 300 ml. of acetone was added 5.3 g. of dimethylcarbamoyl chloride, and the mixture was heated under reflux for one hour. Another 5.3 g. of the carbamoyl chloride was added and refluxing was continued for 30 minutes. The reaction mixture was filtered and the filtrate was diluted with water and allowed to stand for about one hour. The precipitate was collected and dried in air to give 7.0 g. of crystalline 3,5-bis(dimethylcarbamoylthio)-4-isothiazolecarbonitrile, m.p. 190–192° C. An analytical sample recrystallized from a benzene-hexane mixture melted at 191.5–193.5° C.

*Analysis.*—Calcd. for $C_{10}H_{12}O_2N_4S_3$: C, 37.94; H, 3.82. Found: C, 37.49; H, 3.73.

The ultraviolet spectrum of an ethyl alcohol solution showed a maximum at 275 m$\mu$ ($\epsilon$=12,500). The infrared spectrum showed a carbonyl band at $6.0\mu$ and was consistent with the above structure.

Example 27.—3,5-bis(methylthio)-4-isothiazolecarboxamide

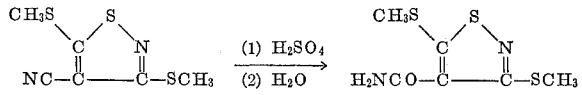

A solution of 0.78 g. of 3,5-bis(methylthio)-4-isothiazolecarbonitrile in 2 ml. of concentrated sulfuric acid was warmed four hours at 60–70° C., and poured into a mixture of ice and water. The precipitated solid was collected on a filter and dried in air to give 0.79 g. of white, crystalline 3,5-bis(methylthio)-4-isothiazolecarboxamide, M.P. 205–207.5° C. An analytical sample prepared from crystallization from benzene melted at 210–210.5° C.

*Analysis.*—calcd. for $C_6H_8ON_2S_3$: C, 32.71; H, 3.67; N, 12.71. Found: C, 32.98; H, 3.91; N, 12.98.

The infrared spectrum was consistent with the above structure: $3.0\mu$ and $3.15\mu$ (NH$_2$), $3.4\mu$ (sat. CH), $6.0\mu$, $6.2\mu$ (primary amide bands), $6.75\mu$ and $7.45\mu$ (isothiazole ring absorption). The ultraviolet spectrum of an ethyl alcohol solution of the product had maxima at 283 m$\mu$ ($\epsilon$=11,400), 235 m$\mu$ ($\epsilon$=11,100), and 212 m$\mu$ ($\epsilon$=10,400).

Example 28.—3,5-bis(methylthio)-4-isothiazolecarboxylic acid

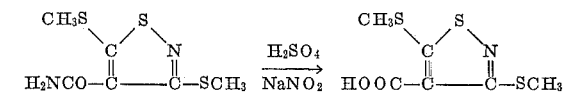

A solution of 2.2 g. of 3,5-bis(methylthio)-4-isothiazolecarboxamide in 40 ml. of concentrated sulfuric acid and 10 ml. of water was cooled to 5–10° C., and there was added slowly a solution of 1.03 g. of sodium nitrite in 4 ml. of water through a tube immersed below the surface of the stirred reaction mixture. The reaction mixture was maintained at 5–10° C. during the addition, which required about 15 minutes, and was then warmed on the steam bath. After 30 minutes the reaction mixture was poured into ice water, and the white solid that formed was collected on a filter, washed with water, and redissolved in aqueous sodium carbonate solution. The alkaline solution was filtered and the filtrate was acidified with dilute hydrochloric acid. Extraction of the mixture with methylene chloride, followed by drying of the organic phase and evaporation, gave 1.39 g. (63% yield) of white, crystalline 3,5-bis(methylthio)-4-isothiazolecarboxylic acid. An analytical sample recrystallized from a mixture of benzene and petroleum ether melted at 241.5–242.5° C.

*Analysis.*—Calcd. for $C_6H_7O_2NS_3$: C, 32.56; H, 3.19; neut. eq., 221. Found: C, 32.89; H, 3.18; neut. eq., 220. The infrared spectrum was consistent with the above structure: broad $3$–$4\mu$ with $6.0\mu$ (COOH), $6.8\mu$ (conj. cyclic C=C and/or C=N). The ultraviolet spectrum, measured in ethyl alcohol solution, had maxima at 282 m$\mu$ ($\epsilon$=29,200), 237 m$\mu$ ($\epsilon$=28,000), and 214 m$\mu$ ($\epsilon$=21,900).

Example 29.—3,5-bis(methylthio)-4-isothiazolecarbonyl chloride

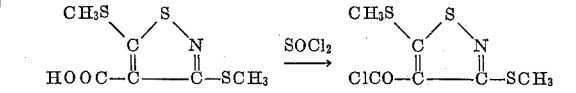

A mixture of 3.3 g. of 3,5-bis(methylthio)4-isothiazolecarboxylic acid and 25 ml. of thionyl chloride was heated under reflux for six hours and allowed to stand 18 hours at room temperature. Evaporation of excess thionyl chloride gave white, solid 3,5-bis(methylthio)-4-isothiazolecarbonyl chloride, M.P. 136–138° C. The infrared spectrum was compatible with structure of the product. The structure was further confirmed by conversion of the product to 3,5-bis(dimethylthio)-4-isothiazolecarboxamide (Example 27) by heating with aqueous ammonium hydroxide.

*Example 30.—Methyl-3,5-bis(methylthio)-4-isothiazolecarboxylate*

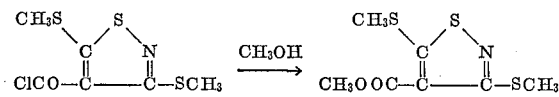

Dissolution of 0.35 g. of the 3,5-bis(methylthio)-4-isothiazolecarbonyl chloride in hot methanol and evaporation gave 0.31 g. of white needles of methyl 3,5-bis(methylthio)-4-isothiazolecarboxylate, M.P. 132–133° C. The infrared spectrum was consistent with the structure of the product.

*Example 31.—N-methyl-3,5-bis(methylthio)-4-isothiazolecarboxamide*

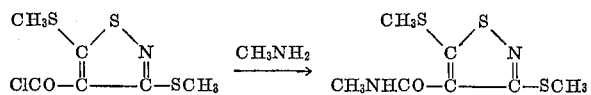

Anhydrous methylamine vapor was passed into a slurry of 1.0 g. of 3,5-bis(methylthio)-4-isothiazolecarbonyl chloride in 100 ml. of anhydrous ethyl ether for 15 minutes. The mixture was allowed to stand 15 minutes and then was washed with water to remove methylammonium chloride. The ether slurry was filtered, and the ether filtrate was washed with sodium carbonate solution, dried over magnesium sulfate, and evaporated. The solid residue was combined with the original filtration residue and recrystallized from methanol to give white crystals of N-methyl-3,5-bis(methylthio) - 4-isothiazolecarboxamide that melted at 162–163° C.

*Analysis.*—Calcd. for $C_7H_{10}ON_2S_3$: C, 35.88; H, 4.31. Found: C, 35.96; H, 4.38.

The ultraviolet absorption spectrum in alcohol showed maxima at 283 m$\mu$ ($\epsilon$=15,500) and 233 m$\mu$ ($\epsilon$=15,000). The infrared absorption spectrum was consistent with the above structure.

*Example 32.—N,N-dimethyl-3,5-bis(methylthio)-4-isothiazolecarboxamide*

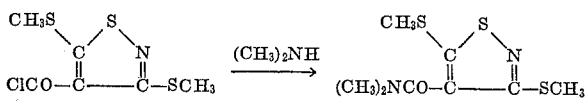

One gram of 3,5-bis(methylthio)-4-isothiazolecarbonyl chloride was mixed with 8 ml. of 25% aqueous solution of dimethylamine, and the mixture was allowed to stand for 30 minutes at room temperature and then heated for 30 minutes on a steam bath. The mixture was extracted with ethyl ether, and the ethereal extract was washed successively with dilute acid, dilute sodium carbonate solution, and saturated sodium carbonate solution. Evaporation of the ether gave N,N-dimethyl-3,5-bis(methylthio)-4-isothiazolecarboxamide as a liquid.

*Example 33.—3,5-bis(methylsulfinyl)-4-isothiazolecarbonitrile*

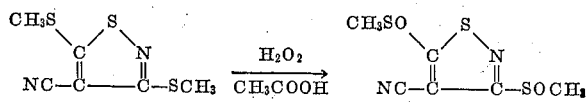

To a stirred slurry of 2.02 g. of 3,5-bis(methylthio)-4-isothiazolecarbonitrile in 10 ml. of glacial acetic acid and 10 ml. of acetic anhydride was added over one hour 2.2 g. of 30% hydrogen peroxide. The reaction mixture became clear when the temperature rose to 30–35° C. and remained in this range during the addition. After standing for three days, the reaction mixture was stirred with one gram of solid manganese dioxide while being warmed on the steam bath, filtered and concentrated at reduced pressure. The concentrate was diluted with water and extracted twice with methylene chloride. Evaporation of the extract after washing with aqueous sodium carbonate solution and drying over magnesium sulfate gave 1.07 g. (48%) of white, solid 3,5-bis(methylsulfinyl)-4-isothiazolecarbonitrile that melted at 118–125° C. An analytical sample recrystallized from benzene melted at 112–126° C. The wide melting range and absorption spectra indicate that the product is a mixture of stereoisomers.

*Analysis.*—Calcd. for $C_6H_6O_2N_2S_3$: C, 30.74; H, 2.57. Found: C, 32.52; H, 2.78.

The infrared spectrum was consistent with the above structure and showed absorption at 3.3$\mu$ and 3.4$\mu$ (CH), 4.47$\mu$ (CN), 6.75$\mu$, 6.8$\mu$ (conj. cyclic C=C and/or C=N), 7.58$\mu$, and 9.4$\mu$ (sulfoxide). The ultraviolet spectrum of an ethyl alcohol solution of the product had a maximum at 285m$\mu$ ($\epsilon$=6,660).

*Example 34.—3,5-bis(benzylsulfinyl)-4-isothiazolecarbonitrile*

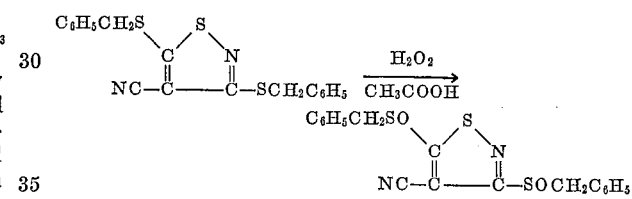

To a slurry of 3.5 g. of 3,5-bis(benzylthio)-4-isothiazolecarbonitrile in 20 ml. of glacial acetic acid and 20 ml. of acetic anhydride was added dropwise with stirring 2.2 g. of 30% hydrogen peroxide. The temperature rose slowly, and when it reached 65° C. the reaction mixture was cooled in an ice bath. The reaction mixture was stirred three hours, diluted with water, and filtered to give a white solid. Extraction of the product with hot benzene and cooling the extract gave 1.09 g. (28%) of white, crystalline 3,5-bis(benzylsulfinyl)-4-isothiazolecarbonitrile, M.P. 140–142° C. An analytical sample was crystallized from benzene and then from methanol as fluffy white needles, M.P. 146–150° C.

*Analysis.*—Calcd. for $C_{18}H_{14}O_2N_2S_3$: C, 55.93; H, 3.66; N, 7.25. Found: C, 55.78; H, 3.61; N, 7.27.

The infrared absorption spectrum was consistent with the above disulfoxide isothiazole structure, showing bands at 3.25$\mu$ (=CH), 3.35$\mu$ and 3.4$\mu$ (sat. CH), 4.45$\mu$ (C≡N), 6.2$\mu$, 6.3$\mu$ and 6.67$\mu$ (cyclic conj. C=C and/or C=N), 9.45$\mu$ (S=O), and 13.05$\mu$ and 14.35$\mu$ (monosubstituted aromatic).

*Example 35.—3,5-bis(methylsulfonyl)-4-isothiazolecarbonitrile*

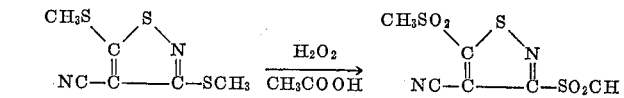

To a slurry of 2.02 g. of 3,5-bis(methylthio)-4-isothiazolecarbonitrile in 10 ml. of acetic anhydride and 10 ml. of glacial acetic acid was added over one hour with stirring 4.8 g. of 30% hydrogen peroxide. The temperature of the reaction mixture rose slowly at first and then quickly to 90° C. An ice bath was applied quickly to moderate the reaction, and addition was continued while the reaction mixture was cooled. After standing two days at room temperature, the reaction mixture had solidified. It was diluted with 200 ml. of water and filtered. The air-dried solid was 3,5-bis(methylsulfonyl)-4-isothiazolecarbonitrile and weighed 2.2 g. (83%), M.P. 190-198° C. Recrystallization from an acetone-methanol mixture gave white crystals that melted at 212-214° C.

*Analysis.*—Calcd. for $C_6H_6O_4N_2S_3$: C, 27.06; H, 2.27. Found: C, 27.29; H, 2.30.

The infrared spectrum was consistent with the above structure and showed absorption at $3.3\mu$ and $3.4\mu$ (sat. CH), $4.45\mu$ (C≡N), $6.75\mu$ (cyclic conj. C=C and/or C=N), and $7.55\mu$ and $8.7\mu$ (—SO$_2$—). The ultraviolet spectrum of an ethyl alcohol solution of the product had a maximum at 270 m$\mu$ ($\epsilon$=6,150).

*Example 36.—3,5-bis(benzylsulfonyl)-4-isothiacarbonitrile*

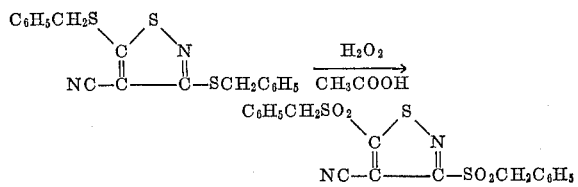

To a stirred slurry of 3.5 g. of 3,5-bis(benzylthio)-4-isothiazolecarbonitrile in 20 ml. of glacial acetic acid and 20 ml. of acetic anhydride was added over one hour 6.0 g. of 30% hydrogen peroxide. The reaction mixture warmed spontaneously to 45° C. and became clear. After the reaction mixture had stood overnight at room temperature, the white needles that formed were collected on a filter, washed liberally with water, and air-dried to give 3.9 g. (95%) of 3,5-bis(benzylsulfonyl)-4-isothiazolecarbonitrile, M.P. 179-181° C. Solution of a sample in a boiling mixture of methylene chloride and chloroform followed by evaporation gave a residue that melted at 198-199° C. An analytical sample melted at 203.5-204° C.

*Analysis.*—Calcd. for $C_{18}H_{14}O_4N_2S_3$: C, 51.65; H, 3.38. Found: C, 51.78; H, 3.29.

The infrared spectrum was consistent with the above disulfone-isothiazole structure: $3.25\mu$ (=CH), $3.35\mu$ and $3.40\mu$ (sat. CH), $4.45\mu$ (C≡N), $6.2\mu$, $6.3\mu$, $6.7\mu$, and $6.8\mu$ (cyclic conj. C=C and/or C=N), and $7.45\mu$, $8.70\mu$, and $8.85\mu$ (—SO$_2$—). The ultraviolet spectrum of an ethyl alcohol solution of the product had a maximum at 268 m$\mu$ ($\epsilon$=6,340).

The products and processes of this invention have been illustrated by the foregoing examples. However, the products of the invention are generic to the compounds defined by Formulae I and II, and the processes are generic to those of the various general equations given. In addition to the foregoing examples, the following also illustrate the products and processes of this invention, and show the extremely broad range of the invention.

The dilithium salt of dicyano-1,1-ethylenedithiol can react with lithium dichromate to give the dilithium salt of 3-hydroxy-5-mercapto-4-isothiazolecarbonitrile.

The diammonium salt of dicyano-1,1-ethylenedithiol can react with ammonium persulfate to give the diammonium salt of 3-hydroxy-5-mercapto-4-isothiazolecarbonitrile, which can react with two equivalents of isobutyryl chloride to give 3-isobutyryloxy-5-isobutyrylthio-4-isothiazolecarbonitrile.

The diammonium salt of dicyano-1,1-ethylenedithiol can react with an ammonium polysulfide (NH$_4$)$_2$S$_x$, where x is 2-9, to give the diammonium salt of 3,5-dimercapto-4-isothiazolecarbonitrile.

The disodium salt of dicyano-1,1-ethylenedithiol can react with sodium perborate to give the disodium salt of 3-hydroxy-5-mercapto-4-isothiazolecarbonitrile.

The dipotassium salt of dicyano-1,1-ethylenedithiol can react with potassium permanganate to give the dipotassium salt of 3-hydroxy-5-mercapto-4-isothiazolecarbonitrile.

The dirubidium salt of dicyano-1,1-ethylenedithiol can react with rubidium peroxide to give the dirubidium salt of 3-hydroxy-5-mercapto-4-isothiozolecarbonitrile.

A bis(substituted-ammonium) salt of dicyano-1,1-ethylenedithiol can react with sulfur to give the corresponding bis(substituted-ammonium) salt of 3,5-dimercapto-4-isothiazolecarbonitrile, which can react with two equivalents of 2-naphthylmethyl bromide to give 3,5-bis-(2 - naphthylmethylthio)-4-isothiazolecarbonitrile, which can be converted in turn to the corresponding amide, carboxylic acid, acid chloride, and ethyl ester.

The dipyrrolidinium salt of dicyano-1,1-ethylenedithiol can react with hydrogen peroxide to give the dipyrrolidinium salt of 3-hydroxy-5-mercapto-4-isothiazolecarbonitrile.

The disodium salt of dicyano-1,1-ethylenedithiol can react with sodium tetrasulfide to give the disodium salt of 3,5-dimercapto-4-isothiazolecarbonitrile.

The bis(tri-n-amylammonium) salt of dicyano-1,1-ethylenedithiol can react with sulfur to give the bis(tri-n-amylammonium) salt of 3,5-dimercapto-4-isothiazolecarbonitrile.

The bis(benzyltrimethylammonium) salt of dicyano-1,1-ethylenedithiol can react with sulfur to give the bis(benzyltrimethylammonium) salt of 3,5-dimercapto-4-isothiazolecarbonitrile.

The products of this invention are useful as polymerization inhibitors. This is shown in the following experiments, in each of which from four to six candidate compounds were examined at one time. The procedure in each experiment was as follows:

EXAMPLES A-D

A monomer-catalyst solution was prepared by dissolving 0.020 g. of $\alpha,\alpha'$-azoisobutyronitrile in sufficient vinyl acetate to make up to 100 ml. in a volumetric flask. Ten milliliters of the test solution, together with 0.02 g. of the test compound, was placed in each of four to six test tubes. In addition, 10 ml. of test solution was placed alone in each of two or three test tubes (controls). The tubes were flushed well with nitrogen, stoppered, and placed in an oil bath at 70-75° C. Heating was continued until the contents of the control tubes became quite viscous. The stoppers of the tubes were removed and a solution of hydroquinone in methanol was added to each tube. The contents of each tube were then subjected to steam distillation to remove methanol and unreacted vinyl acetate. Polymer, if formed, was recovered mechanically, dried under vacuum at 80° C. for 18 hours, and weighed. Results were as follows:

EXAMPLE A

| Additive | Weight of polymer |
|---|---|
| KS–C(=)–S–N=C–OK, NC–C | 0 |
| CH$_3$S–C(=)–S–N=C–OH, NC–C | 0.80 |
| C$_6$H$_5$CH$_2$S–C(=)–S–N=C–OH, NC–C | 0 |
| CH$_3$SO–C(=)–S–N=C–SOCH$_3$, NC–C | 1.2 |
| None | 2.35 |
| None | 2.50 |

EXAMPLE B

| Additive | Weight of polymer |
|---|---|
| CH₃SO₂—C(S)(N)—C(=N)—SO₂CH₃ (NC—C) | 0.22 |
| NaS—C(S)(N)—C(=N)—SNa (NC—C) | 0 |
| C₆H₅CH₂SO—C(S)(N)—C(=N)—SOCH₂C₆H₅ (NC—C) | .03 |
| C₆H₅CH₂S—C(S)(N)—C(=N)—OCH₂C₆H₅ (NC—C) | 0.41 |
| C₆H₅COS—C(S)(N)—C(=N)—SCOC₆H₅ (NC—C) | 0.97 |
| None | 1.50 |
| None | 1.56 |

EXAMPLE C

| Additive | Weight of polymer |
|---|---|
| C₆H₅CH₂S—C(S)(N)—C(=N)—SCH₂C₆H₅ (NC—C) | .06 |
| CH₃S—C(S)(N)—C(=N)—SCH₃ (NC—C) | 0 |
| CH₃SO₂—C(S)(N)—C(=N)—SO₂CH₃ (NC—C) | 0 |
| CH₂=CHCH₂S—C(S)(N)—C(=N)—SCH₂CH=CH₂ (NC—C) | 0.11 |
| C₆H₅CH₂SO₂—C(S)(N)—C(=N)—SO₂CH₂C₆H₅ (NC—C) | 0.13 |
| HOOCCH₂S—C(S)(N)—C(=N)—SCH₂COOH (NC—C) | 0.41 |
| None | 1.63 |
| None | 2.50 |

EXAMPLE D

| Additive | Weight of polymer |
|---|---|
| CH₃S—C(S)(N)—C(=N)—SCH₃ (HOOC—C) | 1.22 |
| CH₃S—C(S)(N)—C(=N)—SCH₃ (H₂NCO—C) | 1.30 |
| C₆H₅COS—C(S)(N)—C(=N)—SC—C₆H₅ (NC—C) | 0.77 |
| None | 1.84 |
| None | 1.31 |
| None | 1.59 |

The results of Examples A, B, C, and D show that the products of this invention give marked, and in some cases complete, inhibition of the polymerization of the typical ethylenically unsaturated monomer vinyl acetate.

This invention provides an extremely broad range of new, useful compositions of matter, and simple processes for making them in good yields from inexpensive starting materials. The processes for making all the key intermediate compounds, and nearly all the final products, are operable in the presence of water, either as a component of the solvent or as an impurity in the reactants. This is important because it permits the use of low-cost solvent systems and makes unnecessary the elimination of water from reaction systems, which can be time-consuming and costly.

Since obvious modifications and equivalents in the invention will be evident to those skilled in the chemical arts, I propose to be bound solely by the appended claims.

The embodiment of the invention in which an exclusive property or privilege is claimed are defined as follows:

1. A compound of the formula

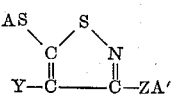

wherein:
(a) Y is selected from the group consisting of cyano, and, when A and A' are organic groups bonded through saturated carbon to the respective S and Z, carboxyl, halocarbonyl, carbamoyl, lower alkyl-substituted carbamoyl and lower alkoxycarbonyl;
(b) Z is selected from the group consisting of oxygen and sulfur;
(c) A is selected from the group consisting of:
   lower alkyl, ar(lower alkyl), lower alkenyl joined to the depicted S through saturated carbon, carboxy(lower alkyl), aroyl of up to 11 carbons, lower alkylcarbonyl, carbamoyl and lower alkyl-substituted carbamoyl;
   metals having a reduction potential of less than one volt; and
   substituted ammonium having up to 16 carbon and selected from the group consisting of

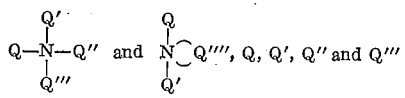

being selected from the group consisting of hydrogen, lower alkyl, lower alkenyl, cycloalkyl and aralkyl and Q'''' is alkylene forming with the depicted N a ring of from 5 to 7 members; and
(d) A' is selected from the group consisting of:
   hydrogen, lower alkyl, ar(lower alkyl), lower alkenyl joined to the depicted Z through saturated carbon, carboxy(lower alkyl), aroyl of up to 11 carbon, lower alkylcarbonyl, carbamoyl and lower alkyl-substituted carbamoyl;
   metals having a reduction potential of less than one volt; and
   substituted ammonium having up to 16 carbons and selected from the group consisting of

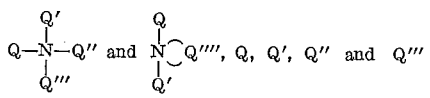

being selected from the group consisting of hydrogen, lower alkyl, lower alkenyl, cycloalkyl and aralkyl and Q'''' is alkylene forming with the depicted N a ring of from 5 to 7 members.

2. 3 - hydroxy - 5 - methylthio - 4 - isothiazolecarbonitrile.
3. 5-benzylthio-3-hydroxy-4-isothiazolecarbonitrile.
4. 5-benzylthio-3-mercapto-4-isothiazolecarbonitrile.
5. 3-benzyloxy-5-methylthio-4-isothiazolecarbonitrile.
6. 3-benzyloxy-5-benzylthio-4-isothiazolecarbonitrile.
7. 3,5-bis(methylthio)-4-isothiazolecarbonitrile.
8. 3,5-bis(carboxymethylthio)-4-isothiazolecarbonitrile.
9. 3-benzoyloxy-5-benzoylthio-4-isothiazolecarbonitrile.
10. 3,5-bis-(acetylthio)-4-isothiazolecarbonitrile.
11. The process which comprises reacting a compound of the formula $(NC)_2C=C(SM')_2$, wherein $M'$ is selected from the group consisting of alkali metals, ammonium and substituted ammonium groups, with a member of the group consisting of oxygen, hydrogen and metal peroxides, inorganic persulfates, percarbonates, perborates, permanganates, dichromates, and perchlorates, alkali-metal ferricyanides, sulfur and inorganic polysulfides.
12. The disodium salt of 3-hydroxy-5-mercapto-4-isothiazolecarbonitrile.
13. The dipotassium salt of 3-hydroxy-5-mercapto-4-isothiazolecarbonitrile.
14. The bistriethylammonium salt of 3-hydroxy-5-mercapto-4-isothiazolecarbonitrile.
15. The disodium salt of 3,5-dimercapto-4-isothiazolecarbonitrile.
16. The bistriethylammonium salt of 3,5-dimercapto-4-isothiazolecarbonitrile.
17. The lead salt of 3-hydroxy-5-mercapto-4-isothiazolecarbonitrile.
18. The silver salt of 3-hydroxy-5-mercapto-4-isothiazolecarbonitrile.
19. The mercuric salt of 3-hydroxy-5-mercapto-4-isothiazolecarbonitrile.
20. The silver salt of 3,5-dimercapto-4-isothiazolecarbonitrile.
21. The barium salt of 3,5-dimercapto-4-isothiazolecarbonitrile.
22. 3,5-bis(methylthio)-4-isothiazolecarboxamide.
23. 3,5-bis(methylthio)-4-isothiazolecarboxylic acid.
24. 3,5-bis(methylthio)-4-isothiazolecarbonyl chloride.
25. Methyl 3,5 - bis(methylthio) - 4 - isothiazolecarboxylate.
26. N,N - dimethyl - 3,5 - bis(methylthio) - 4 - isothiazolecarboxamide.
27. A compound of the formula

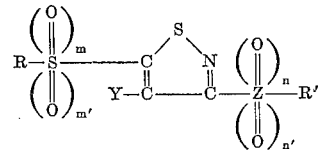

wherein:
(a) Y is selected from the group consisting cyano, carboxyl, halocarbonyl, carbamoyl, lower alkyl-substituted carbamoyl and lower alkoxycarbonyl;
(b) Z is selected from the group consisting of oxygen and sulfur;
(c) R and R', which may be the same, are selected from the group consisting of lower alkyl, ar(lower alkyl), lower alkenyl joined to the depicted S through saturated carbon and carboxy(lower alkyl); and
(d) $m$, $m'$, $n$ and $n'$ are numbers from 0 to 1, inclusive, whose sum is at least 1, $n$ and $n'$ always being 0 when Z is oxygen and, when Z is sulfur, the sum of $m$ and $m'$ not differing from the sum of $n$ and $n'$ by more than 1.
28. 3,5-bis(methylsulfinyl)-4-isothiazolecarbonitrile.
29. 3,5-bis-(benzylsulfinyl)-4-isothiazolecarbonitrile.
30. 3,5-bis(methylsulfonyl)-4-isothiazolecarbonitrile.
31. 3,5-bis(benzylsulfonyl)-4-isothiazolecarobintrile.

References Cited by the Examiner
UNITED STATES PATENTS
1,661,998 3/1928 Carson _____ 260—306.5
3,008,967 11/1961 Blomstrom et al. ____ 260—465.8

NICHOLAS S. RIZZO, *Primary Examiner.*
DUVAL T. McCUTCHEN, *Examiner.*